(12) United States Patent
Tseng et al.

(10) Patent No.: US 7,104,671 B2
(45) Date of Patent: Sep. 12, 2006

(54) LAMP REPLACEMENT

(75) Inventors: Wen-Pao Tseng, Yangmei Taoyuan (TW); Hsin-Chien Chiang, Yangmei Taoyuan (TW)

(73) Assignee: K-Bridge Electronics Co., Ltd., Yangmei Taoyuan (TW)

( * ) Notice: Subject to any disclaimer, the term of this patent is extended or adjusted under 35 U.S.C. 154(b) by 0 days.

(21) Appl. No.: 10/855,642

(22) Filed: May 28, 2004

(65) Prior Publication Data

US 2005/0265043 A1 Dec. 1, 2005

(51) Int. Cl.
*F21S 4/00* (2006.01)

(52) U.S. Cl. .................. 362/224; 362/558; 362/633; 362/613; 362/656; 362/652

(58) Field of Classification Search .................. 362/632, 362/633, 634, 224, 558, 613, 624, 625, 225, 362/226, 652, 656, 27
See application file for complete search history.

(56) References Cited

U.S. PATENT DOCUMENTS

| 5,392,199 | A  | * | 2/1995 | Kashima et al. | ............ | 362/606 |
| 6,947,104 | B1 | * | 9/2005 | Yu et al. | ........................ | 349/61 |
| 2005/0002173 | A1 | * | 1/2005 | Chuang et al. | ................ | 362/31 |
| 2005/0002205 | A1 | * | 1/2005 | Yu et al. | ..................... | 362/555 |

* cited by examiner

*Primary Examiner*—Renee Luebke
*Assistant Examiner*—Zahra I. Bennett
(74) *Attorney, Agent, or Firm*—Troxell Law Office, PLLC

(57) ABSTRACT

A direct type backlight modulus lamp replacement device with each lamp respectively being fixed in a replacement device, the replacement device being provided at the bottom of the lampshade in relation to a slot of the lamp, a recess being formed in the device to place the lamp, a positioning part being each extended from both sides of the recess to secure the device at the bottom of the lampshade so to replace the lamp only by removing it from the lampshade without removing the entire reflection lampshade.

14 Claims, 6 Drawing Sheets

LAMP REPLACEMENT

BACKGROUND OF THE INVENTION (a) Field of the Invention

The present invention is related to a lamp replacement device, and more particularly to one for the replacement of lamp in a direct type backlight modulus.

(b) Description of the Prior Art

As illustrated in FIG. 1 of the accompanying drawings for a sectional view of a direct type backlight modulus generally available in the market, the entire direct type backlight modulus is comprised of a reflection lampshade, multiple light sources, a diffuser plate 30, a diffuser film 40, a prism 50, a reflection deflector 60 and a LCD 70 arranged in sequence inside out. Wherein, each of those sources may be provided in a form of a straight strip, U-shape or other continuously curved lamp 20, arranged at a proper spacing at where between the reflection lampshade and the diffuser plate 30 and fixed to the reflection lampshade 10 to emit lights for the display effects by the liquid crystal modulus. Those multiple films provided between the diffuser plate 30 and the LCD 70 can be also comprised of 1~2 diffusers, 0~2 prisms, and 0~1 reflection deflectors to diffuse the light for eliminating possible brighter or darker area on the LCD due to the absence of light emission from the spacing between two light sources 20.

However, the lamp has a given service life and requires service or replacement to maintain consistent light emissions to the LCD. In replacing the lamp of the direct type backlight modulus of the prior art, first all the diffuser plate 30, the diffuser film 40, the prism 50, the reflection deflector 60 and the LCD 70 on the top of the reflection lampshade 10 must be removed one by one; or alternatively, the entire reflection lampshade 10 is removed from the back of the LCD, then the lamp to be replaced is removed from the reflection lampshade 10 to be replaced with a new lamp, the new lamp is fixed into the reflection lampshade 10, and finally, all the diffuser plate 30, the diffuser film 40, the prism 50, the reflection deflector 60, and the LCD 70 are assembled one by one in sequence to where below the reflection lampshade 10, or the reflection lampshade 10 is assembled to the back of the LCD 70 to complete the replacement of the lamp for a direct type backlight modulus.

The replacement of a lamp for a direct type backlight modulus of the prior art can only be done by having first removed the devices on the reflection lampshade or the entire reflection lampshade. The replacement involves multiple steps and becomes too complicate disregarding how many lamps to be replaced. Furthermore, both of the reflection lampshade and the lamp itself are comparatively heavy, any act of omission during the handling would result in damaged direct type backlight modulus or the LCD.

SUMMARY OF THE INVENTION

The primary purpose of the present invention is to provide a lamp replacement device for the direct type backlight modulus without removing the reflection lampshade. To achieve the purpose, each lamp is fixed to a replacement device, which is provided at the bottom of the reflection lampshade in relation to the slot of each lamp; a recess is formed inside the replacement device for the placement of the lamp; and both sides of the recess further extends to define a positioning part to hold the replacement device in position at the bottom of the reflection lampshade. Accordingly, if a lamp replacement is desires, simply disengage the replacement device downward from the reflection lampshade.

DETAILED DESCRIPTION OF THE PREFERRED EMBODIMENTS

Figure 1:
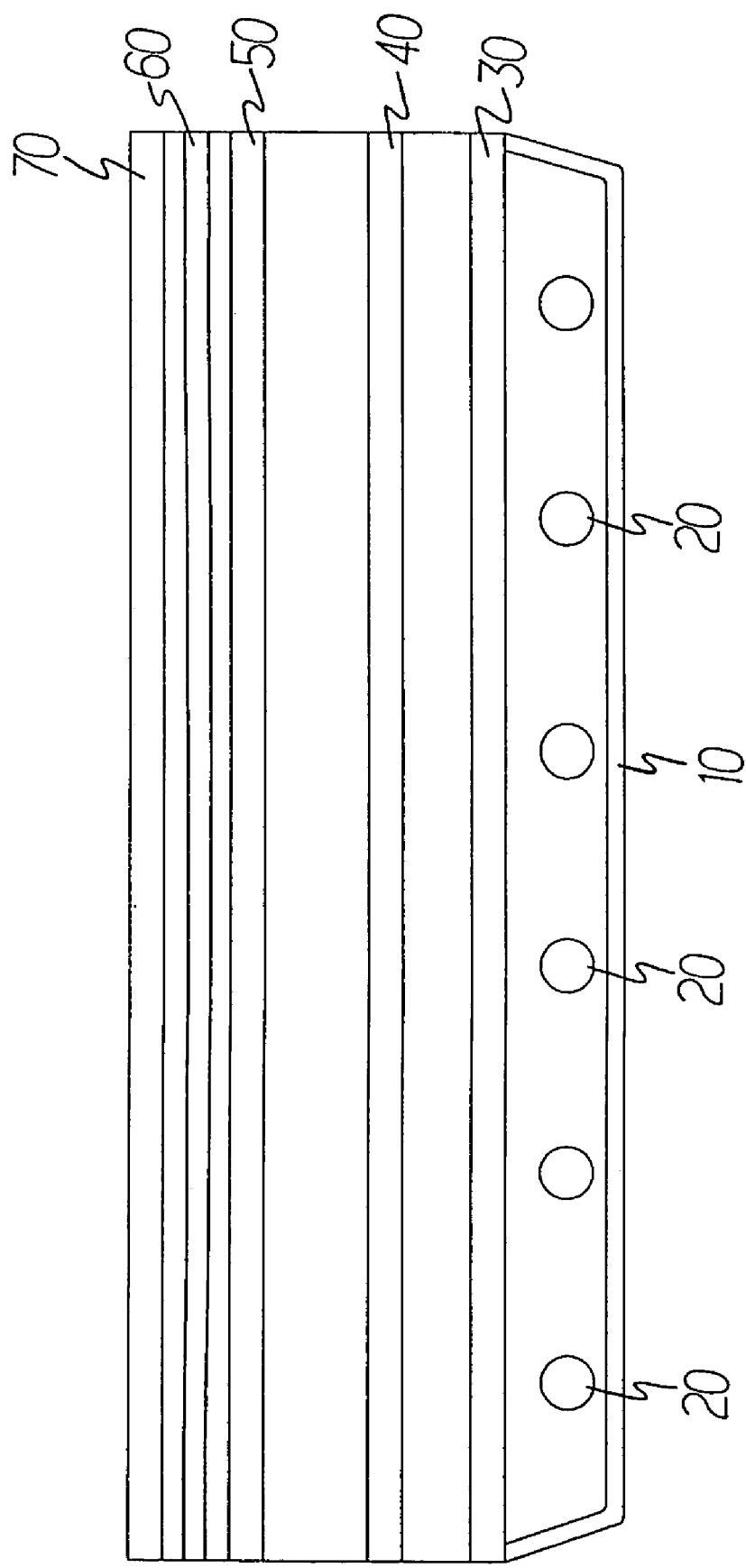
FIG. 1 is a sectional view of a structure of a direct type backlight modulus of the prior art.
Figure 2:
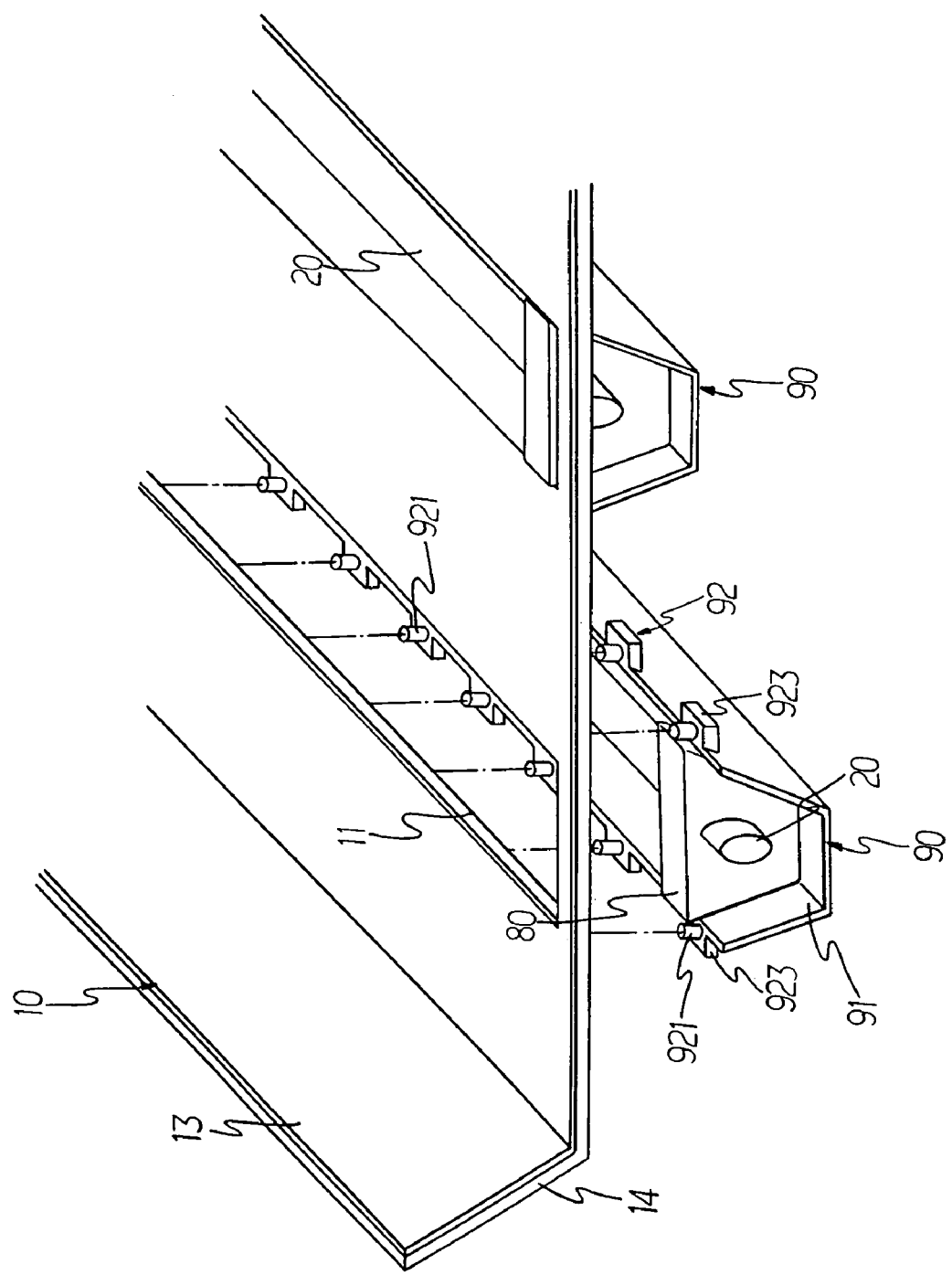
FIG. 2 is a perspective view of a reflection lampshade and a lamp replacement device of a first preferred embodiment of the present invention.
Figure 3:
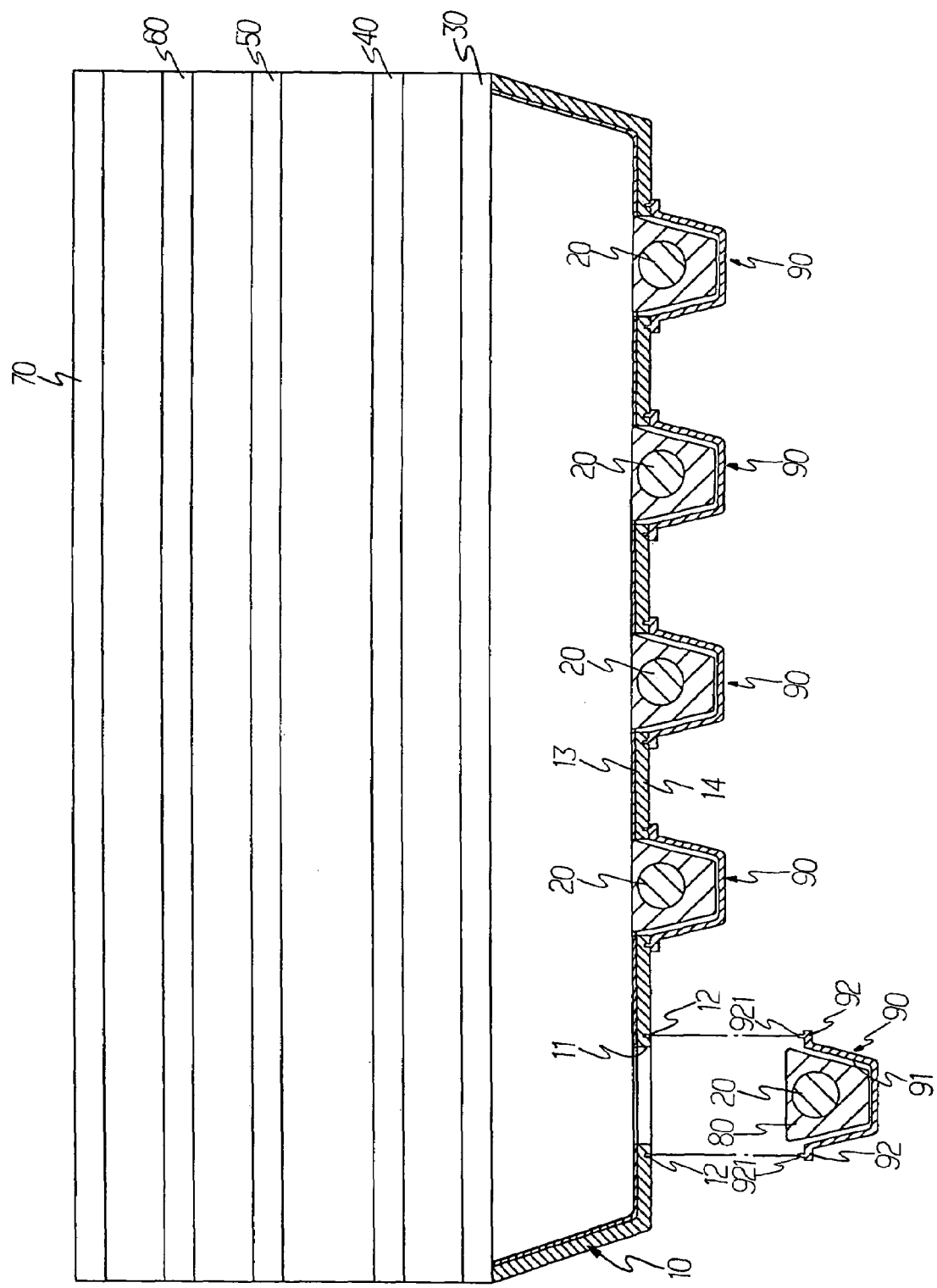
FIG. 3 is a sectional view of a direct type backlight modulus of the first preferred embodiment of the present invention.

As illustrated in FIGS. 2 and 3, a basic construction of a direct type backlight modulus provided with a lamp replacement device of the present invention is comprised of a reflection lampshade 10, multiple sources, a diffuser plate 30, a diffuser film 30, a prism 50, a reflection deflector 60 and a protection panel 70 in sequence inside out. Wherein, each source may be provided in the form of a straight strip, U-shape or other continuously curved lamp 20 arranged at a proper spacing between the reflection lampshade 10 and the diffuser plate 30. The reflection lampshade 10 is comprised of a reflection material 13 (e.g. Polyethylene terephthalate, PET) provided on the inner side and a shade 14 (e.g., aluminum back plate, plastic sheet. . . etc.) fixed to the outer side of the reflection material 13. If the reflection material 13 relates to a metallic material (e.g., silver layer), the shade 15 may be or may not be provided to the outer side of the reflection material 13 since the reflection material 13 alone is sufficient to reflect the light emitted from the lamp 20 to the diffuser plate 30 and then through those multiple films for the liquid crystal modulus to achieve its display purpose.

Figure 4:
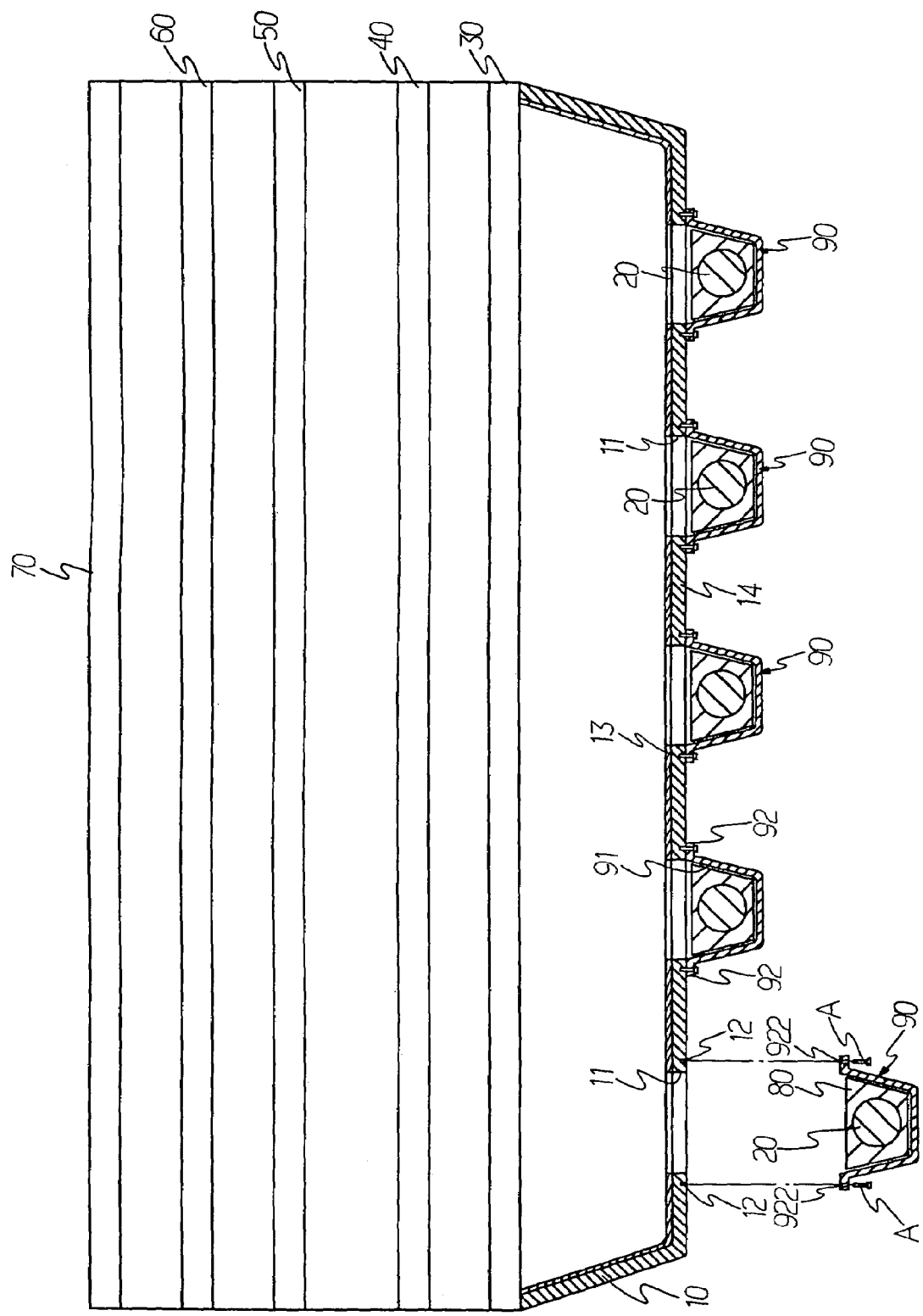
FIG. 4 is sectional view of a direct type backlight modulus of a second preferred embodiment of the present invention.

Each lamp 20 is fixed with a silicon cap 80 into a replacement device 90, which is provided at the bottom of the reflection lampshade 10 in relation to a slot 11 of the lamp 20. A recess 91 is formed inside the replacement device for the placement of the lamp 20, and both sides of the recess 91 further extend to define each a positioning part 92. As illustrated in FIG. 3, a positioning pin 921 is disposed on where both of the positioning part 92 is bound to the reflection lampshade 10; and a positioning hole 12 is relatively provided on the reflection lampshade 10 for the positioning part 92 to be inserted into each other in position with the reflection lampshade 10. Or alternatively as illustrated in FIG. 4, a locking hole 922 is provided on where the positioning part 91 is bound to the reflection lampshade 10, the positioning hole 12 is relatively provided on the reflection lampshade 10 to permit an insertion of a screw A to lock both of the positioning part 92 and the reflection lampshade 10 in position, thus to secure the replacement device 90 to the bottom of the reflection lampshade 10.

Whereas the replacement device 90 is secured in position at the bottom of the reflection lampshade 10 in relation to the slot 12 at the reflection lampshade 10, the lamp 20 can be provided in a from of protrusion from or recess into the bottom of the reflection lampshade 10 without comprising the lamp 20 in emitting the source from the lamp 20 to reach the liquid crystal modulus for display. In the event of replacing any one lamp 20, it takes only to downward remove the replacement device 90 fixed to that lamp 20 for the positioning pin 921 of the positioning part 92 to clear out of the positioning hole 12 of the reflection lampshade 10. Accordingly, the replacement device 90 and the lamp 20 therein to be forthwith disengaged form the reflection lampshade 10 for the replacement or service of the lamp 20 without consuming too much time and efforts.

Figure 5:
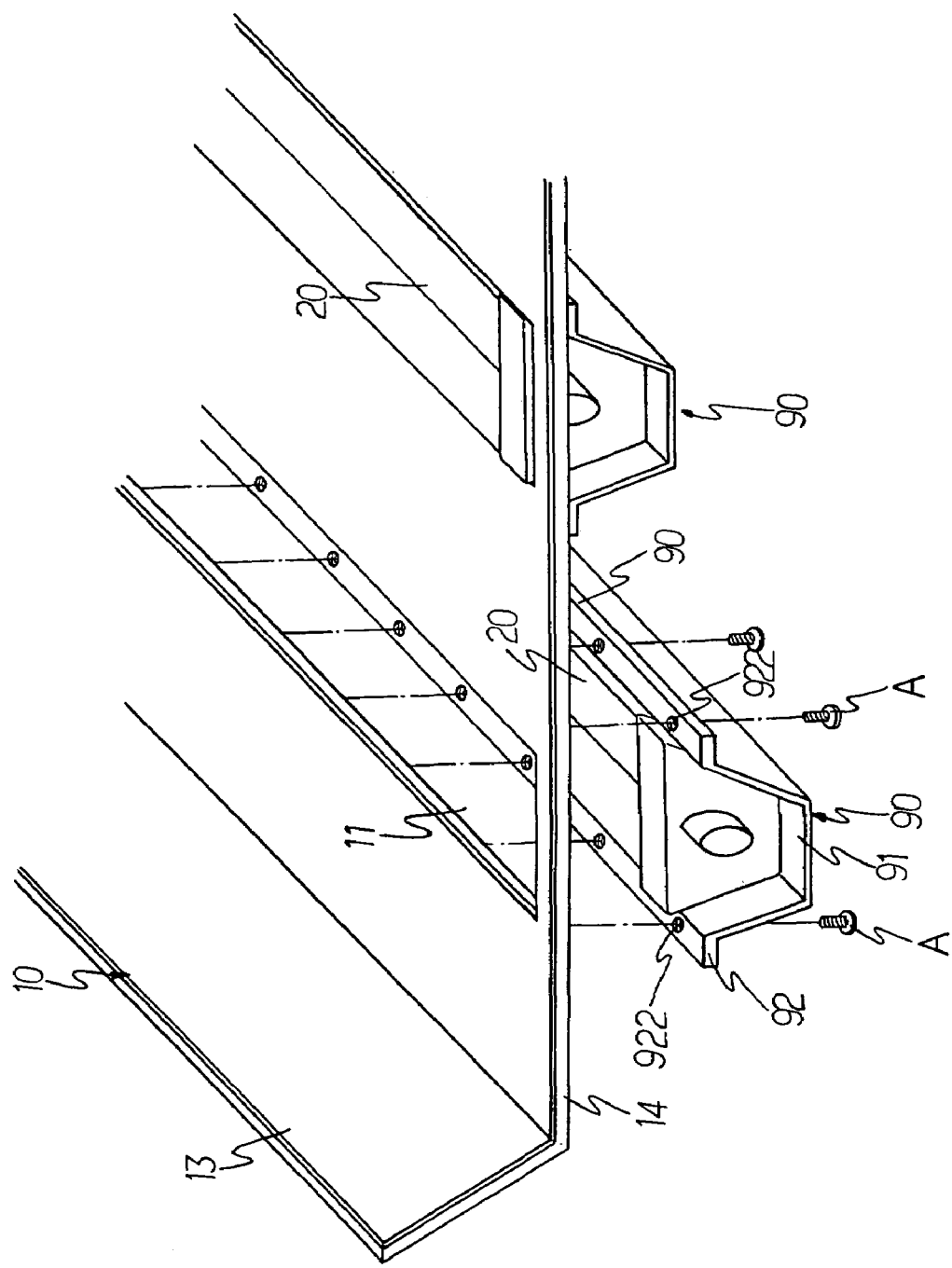
FIG. 5 is a perspective view of a reflection lampshade and a lamp replacement device of a third preferred embodiment of the present invention.

As illustrated in FIG. 5, the positioning part 92 can be comprised of multiple positioning edges 922 protruding from where appropriately on both sides of the recess.

Figure 6:
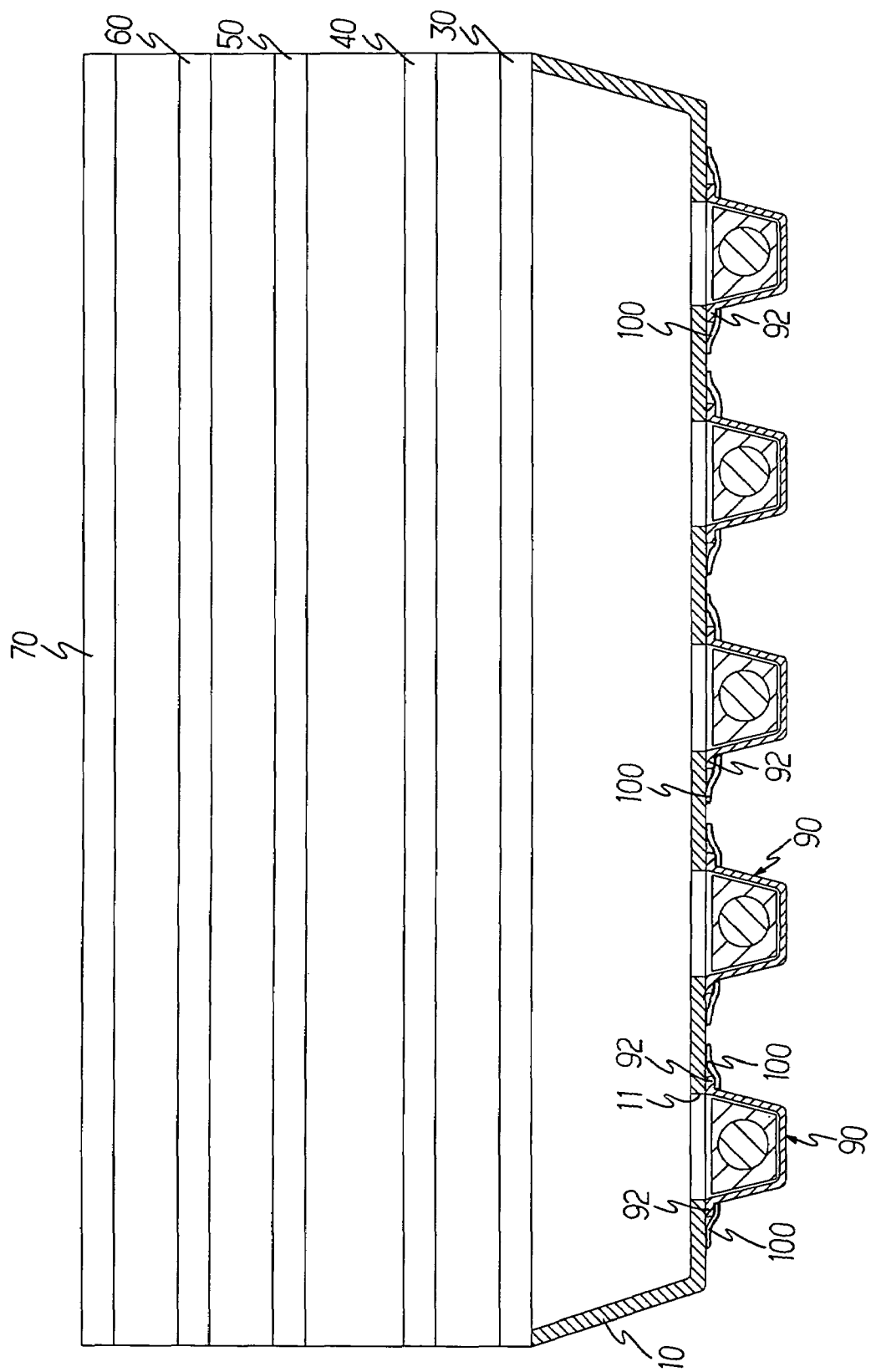
FIG. 6 is a perspective view of a reflection lampshade and a lamp replacement device of a fourth preferred embodiment of the present invention.

Furthermore, an adhesive tape 100 is used for the replacement device 90 to adhere the positioning part 91 to the bottom of the reflection lampshade 10 as illustrated in FIG. 6; or alternatively, a both sided adhesive tape to fixed both of the positioning part 91 and the reflection lampshade in position to each other for achieving the same fast replacement or service purpose.

As disclosed above, the present invention provides a better and feasible way to replace the lamp from a direct type backlight modulus without having to remove the entire backlight lampshade as found with the prior art; therefore, an application for a utility patent is duly filed accordingly. It is to be noted that the specification and the accompanying drawings are provided as one of the preferred embodiments of the present invention and in no way restrict the teaching of the present invention; any structure, device and/or characteristics identical with or similar to that of the present invention shall be deemed as falling with the objectives of and the claimed to be claimed in the present invention.

We claim:

1. A direct type backlight modulus comprising:
   a) a reflection lampshade having a plurality of slots located in a bottom thereof;
   b) a plurality of optical films located above the reflection lampshade;
   c) a protection panel located above the plurality of optical films;
   d) a plurality of light sources, each of the plurality of light sources has a shape selected from a group consisting of a straight strip and a U-shape; and
   e) a plurality of replacement devices, one of the plurality of replacement devices aligning with each of the plurality of slots, each of the plurality of replacement devices having:
      i) a recess, one of the plurality of light sources is located in each recess; and
      ii) two positioning parts connected to a bottom of the reflection lampshade, one of the two positioning parts is located on each side of the recess.

2. The direct type backlight modulus according to claim 1, wherein the plurality of optical films include a diffuser plate, a diffuser film located above the diffuser plate, a prism located above the diffuser film, and a reflection deflector located above the prism.

3. The direct type backlight modulus according to claim 1, further comprising a plurality of silicon caps, each of two opposing ends of one of the plurality of light sources is connected to each of the plurality of replacement devices by one of the plurality of silicon caps.

4. The direct type backlight modulus according to claim 1, wherein each of the two positioning parts has at least one positioning pin, the reflection lampshade having at least one positioning hole for each of the plurality of slots, one of the at least one positioning pin is inserted into each of the at least one positioning hole.

5. The direct type backlight modulus according to claim 1, further comprising a plurality of screws, each of the two positioning parts has at least one locking hole, the reflection lampshade having at least one positioning hole for each of the plurality of slots, one of the plurality of screws is inserted through each of the at least one locking hole and connected with one of the at least one positioning hole.

6. The direct type backlight modulus according to claim 1, wherein the plurality of light sources protrude into the reflection lampshade.

7. The direct type backlight modulus according to claim 1, wherein one of the plurality of light sources is located below each of the plurality of slots of the reflection lampshade.

8. The direct type backlight modulus according to claim 1, wherein one of the plurality of light sources protrudes into each of the plurality of slots of the reflection lampshade.

9. The direct type backlight modulus according to claim 1, wherein the reflection lampshade has a metallic reflection material covering an interior thereof.

10. The direct type backlight modulus according to claim 1, wherein the reflection lampshade has a reflection material covering an interior thereof.

11. The direct type backlight modulus according to claim 10, wherein the reflection material is polyethylene terephthalate.

12. The direct type backlight modulus according to claim 1, wherein the reflection lampshade is made of a metallic reflection material.

13. The direct type backlight modulus according to claim 1, further comprising an adhesive tape connecting the two positioning parts of each of the plurality of replacement devices to the bottom of the reflection lampshade.

14. The direct type backlight modulus according to claim 1, further comprising a double-sided adhesive tape connecting the two positioning parts of each of the plurality of replacement devices to the bottom of the reflection lampshade.

* * * * *